（12） United States Patent
Cayse et al.

(10) Patent No.: US 6,328,028 B1
(45) Date of Patent: Dec. 11, 2001

(54) SELF-CONTAINED CHARCOAL PRODUCT, AND METHOD

(75) Inventors: Bruce Cayse, West Bend; David Caruso, Oconomowoc, both of WI (US)

(73) Assignee: BCDC Enterprises, Oconomowoc, WI (US)

( * ) Notice: Subject to any disclaimer, the term of this patent is extended or adjusted under 35 U.S.C. 154(b) by 0 days.

(21) Appl. No.: 09/547,479

(22) Filed: Apr. 12, 2000

(51) Int. Cl.⁷ ....................................... A47J 37/00
(52) U.S. Cl. ..................... 126/25 R; 126/25 B; 44/519; 44/520; 44/532; 220/2
(58) Field of Search ................... 126/25 R, 9 R, 126/9 A, 9 B, 25 B; 44/533, 534, 519, 520, 541, 522, 544; 220/2, 6, 7, 4.29, 4.31, 4.32; 206/96

(56) References Cited

U.S. PATENT DOCUMENTS

| | | | | |
|---|---|---|---|---|
| 1,401,803 | * | 12/1921 | Lynes | 126/25 B |
| 3,031,277 | * | 4/1962 | Strauss | 44/520 |
| 3,370,582 | * | 2/1968 | Rauh | 126/9 R |
| 4,906,254 | * | 3/1990 | Antosko | 44/520 |
| 4,953,533 | * | 9/1990 | Witt | 126/25 B |
| 5,374,289 | * | 12/1994 | Campana | 44/519 |

* cited by examiner

*Primary Examiner*—James C. Yeung
(74) *Attorney, Agent, or Firm*—Godfrey & Kahn, S.C.

(57) ABSTRACT

A portable, stackable, all-in-one, combustible fuel package composed of a carton without internal structure and containing a fire starting material and charcoal or other combustible material, a one-piece carton blank for forming the carton, and methods of assembling and using the carton and its components to provide a heat source are provided. The carton blank is a simple design for easy assembly of the carton. The container maintains the firestarter separate from the charcoal material and allows direct access to the firestarter for its removal from the container. The carton includes selectively deployable legs structured to raise the carton off of a surface sufficient for placement of the firestarter under the carton and allow air flow to the base of the container to maintain the burning of the firestarter and charcoal material inside the container. In use, the firestarter is removed from the carton, the legs are deployed to raise said carton, the firestarter is positioned beneath the carton and between the legs, the firestarter is lit and allowed to burn the carton and kindle the charcoal housed inside. The charcoal package can be conveniently used for barbecuing at tailgating parties and other outdoor events with no need for lighter fluid or cleanup.

62 Claims, 15 Drawing Sheets

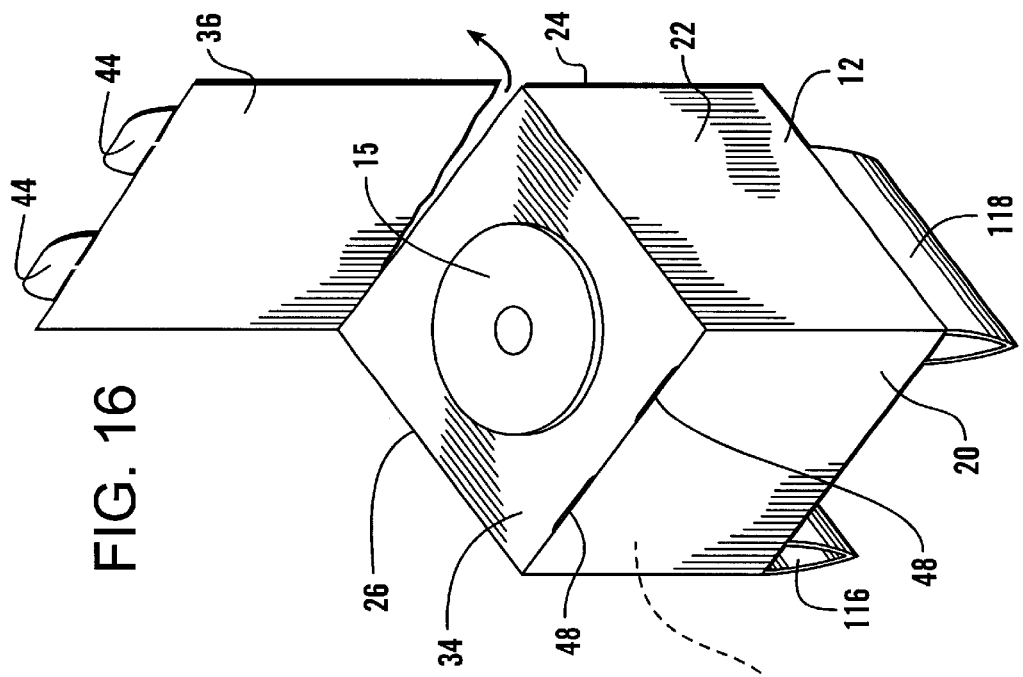
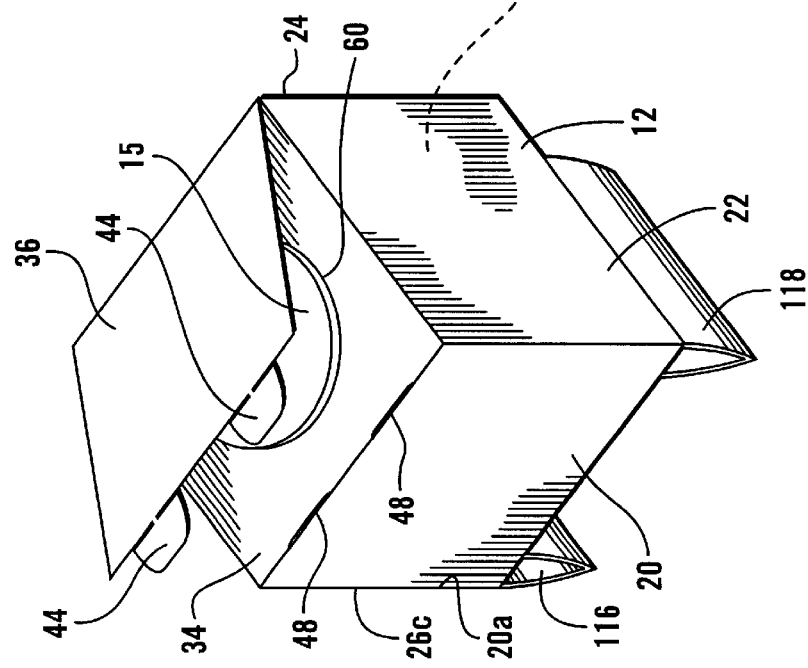

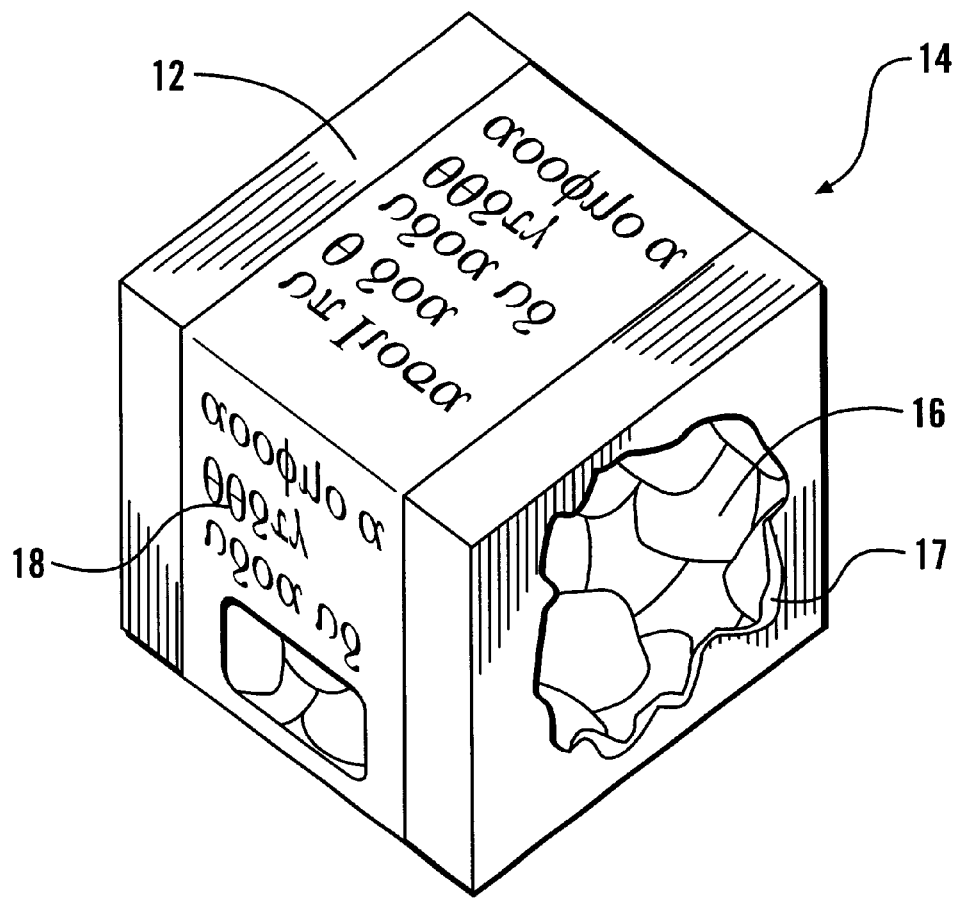
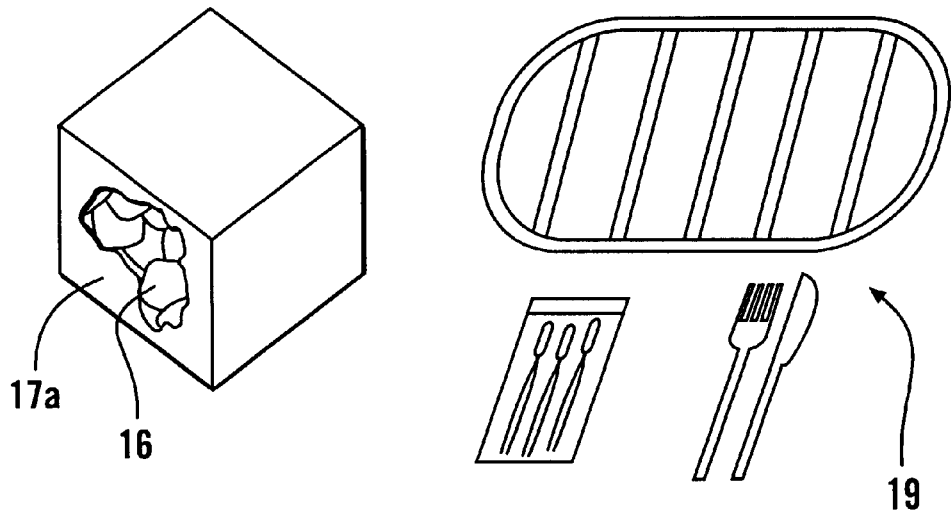
FIG. 18

SELF-CONTAINED CHARCOAL PRODUCT, AND METHOD

FIELD OF THE INVENTION

This application relates generally to outdoor cooking products, and more particularly to a carton containing a firestarter and combustible material for use in outdoor cooking and barbecuing.

BACKGROUND OF THE INVENTION

Typically, charcoal briquettes are purchased in bulk in a large bag. A portion of briquettes is removed, generally saturated with a combustible liquid (typically a petroleum distillate), then ignited. Transferring charcoal briquettes from the bag to the grill, and arranging them on the grill can be messy, and use of a starter fluid that must be stored poses a potential fire hazard. Some efforts have been made to impregnate the charcoal briquettes with a combustible liquid to avoid the need for a separate starter fluid. However, this is expensive to make, emits volatile organic compounds in the manufacturing process, emits an offensive odor when cooking and can impart a bad taste to the food being cooked. To avoid the mess and inconvenience, combustible packages have been described that contain the charcoal in an effort to minimize handling and positioning of the charcoal for burning.

For example, U.S. Pat. No. 2,834,661 (Chaplin) and U.S. Pat. No. 2,955,029 (Foote) describe two-part containers molded from pulp having an inside wall that forms a central chimney. As the walls of the chimney section burn, the charcoal is fed into the center. The packages include ribs or recesses to provide an air passage underneath the package.

U.S. Pat. No. 3,031,277 (Strauss) discloses a complicated multipart fire kindling device made of a container with a complicated fuel insert, and charcoal or other fuel loaded into the container.

U.S. Pat. No. 4,460,377 (Kalil) discloses a container with a complex structure including an upper compartment containing charcoal or other combustible material, and a lower compartment containing a paraffin wax firelighter. A central flue extends from the lower chamber through the upper chamber.

U.S. Pat. No. 4,953,533 (Witt) describes a complexly shaped combustible package for outdoor grilling having a central chimney, and an unspecified ignitor that is lit with a fuse.

U.S. Pat. No. 5,186,721 (Campana) describes a fuel package in which an inorganic ignitor with a wick element, which produces a thermite reaction, is positioned inside the container with the charcoal.

A drawback of the foregoing fuel packages is that they require multiple separate components, central chimneys, or complicated structure for forming the package. The packages are complex, costly, have low efficacy, and present manufacturing problems and safety hazards. The irregular external shapes and other structural characteristics limit the useful visible or printing space on the package, or preclude the use of an overwrap, either of which might be used to provide advertising and coupon space. When an igniting material is packaged inside the container in contact with the charcoal, there is a danger that the ignitor material will accidentally ignite, presenting a hazard during shipping or storage. Where no ignitor is provided, some sort of starter fluid is likely needed as the burning of the cardboard structures, in and of themselves, are not likely to provide sufficient fuel to get the charcoal to a state suitable for cooking. Many of these packages are also irregularly shaped. This precludes tight stacking of multiple packages for shipping and display purposes.

Therefore, it would be desirable to provide a charcoal package with improved features that overcome the shortcomings of other fuel packages.

SUMMARY OF THE INVENTION

These and other objects and advantages are achieved in a self-contained fuel package made of a carton containing a fire starting material and charcoal or other combustible material, a carton blank for forming the carton, and methods of assembling and using the carton and its components to prepare a heat source for cooking.

The carton includes a pair of foldable legs underneath the carton. The underside of the carton preferably includes vent holes, or a perforated or thin center section, between the legs to permit access to the charcoal by a flame, and air flow into the container. In use, the legs of the box are folded out and into position, and a solid firestarter product placed between the legs under the center of the carton, and lit. The flame then consumes the carton and kindles the charcoal while the firestarter expends itself.

Advantageously, the integrated package provides a portable, all-in-one, charcoal package that can be used on a non-igniting support surface, frame or rack, for fast and easy barbecuing in the backyard, tailgating in the middle of a parking lot at a sporting event, or at any number of locations and events. It eliminates the need for additional items for the consumer to transport to a location, and the problem of purchasing goods in different units. It also eliminates the need for liquid lighter fluid, pre-allocation of charcoal, and the need to carry out or dispose of leftover charcoal after the cookout if less than a full bag is used. The single-use carton fires up fast, provides a simple burn, is entirely consumed, and eliminates messy clean-ups. The package eliminates the need for direct handling of charcoal, which is contained within the carton. The carton and its contents are readily ignitable and will form a suitable bed of coals for cooking. The carton blank is a simple design that is easily assembled into the carton. The carton itself is stackable on a pallet, and allows for easy shipping and space-saving, in-store stacking of the product. Moreover, the simple shape of the carton lends itself to direct printing or otherwise permits the use of an overwrap that can be used for advertising, coupons or the like. The carton also preferably includes structure to maintain the ignitor or the firestarter securely in the carton and separate from the charcoal or other combustible material during storage and shipping, and allow the firestarter to be readily removed from the carton for use. The carton is easy to convert from its storage/shipping form to its "firestarting" form.

BRIEF DESCRIPTION OF THE DRAWINGS

Throughout the following views, reference numerals will be used on the drawings, and the same reference numerals will be used throughout the several views and in the description to indicate same or like parts of the invention.

FIG. 15 is a perspective view of the carton of FIG. 14, showing the second top panel 36 lifted up to expose the firestarter 15;

FIG. 16 is a perspective view of the carton of FIG. 15, showing removal of the second top panel 36 from the carton;

FIG. 18 is a perspective view of an embodiment of a kit 14 incorporating the carton of FIG. 12 and other items.

DETAILED DESCRIPTION OF THE INVENTION

Figure 1:
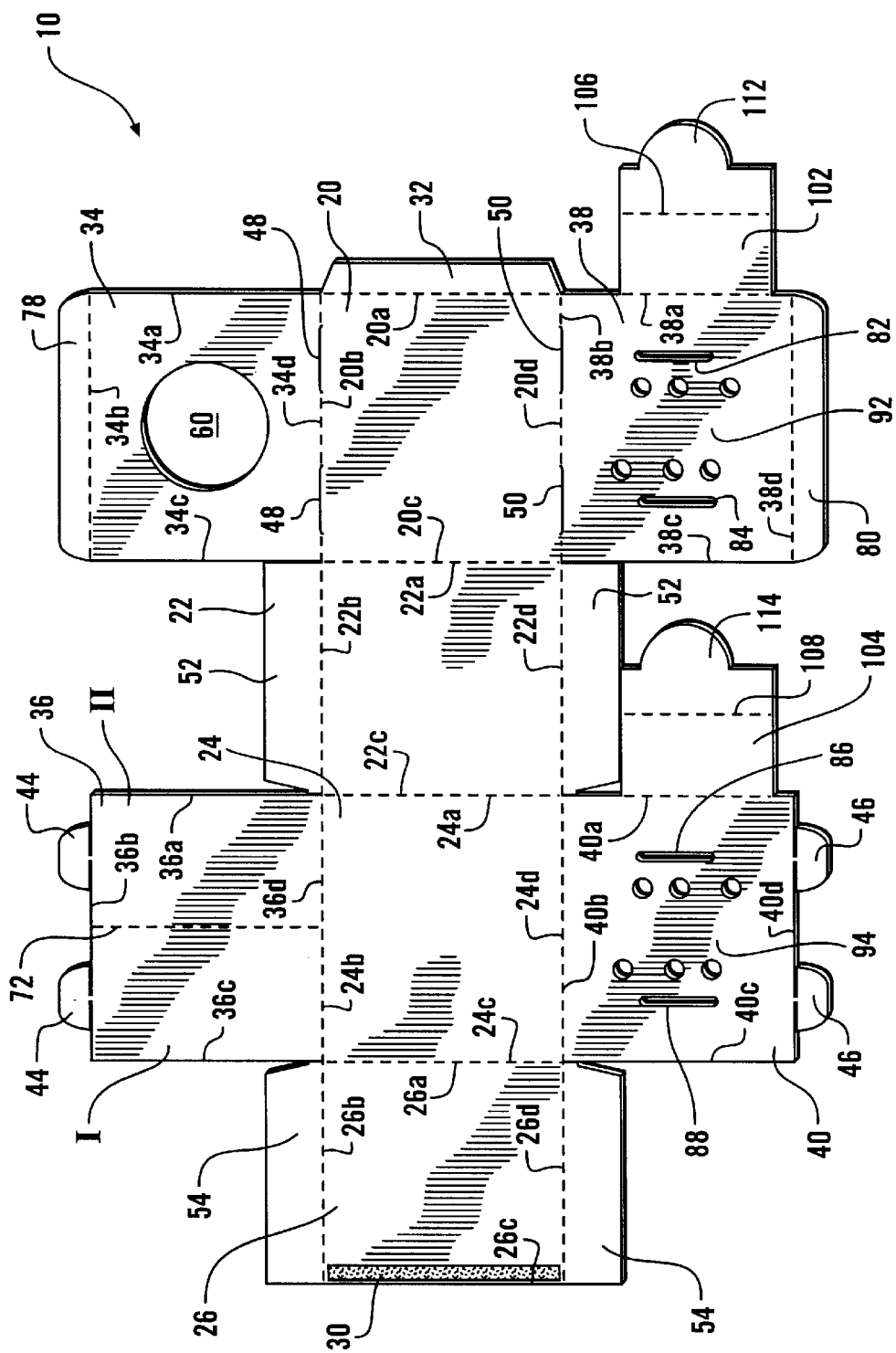
FIG. 1 is perspective view of an embodiment of a blank used to form the carton in accordance with the invention.

The carton of the present invention can be constructed from a carton blank that is cut and scored as one piece. An embodiment of a carton blank 10 is shown in FIG. 1, and a carton 12 assembled from the blank 10 is shown in FIGS. 12–16.

The carton 12 can be combined with materials for igniting and starting a fire, and sold as an integrated unit or kit 14 for generating a cooking fire, as shown in FIG. 18. The kit 14 preferably includes the carton, a solid fire starting material 15 (FIG. 15 removably held in the carton for igniting the carton and the charcoal, and a single meal quantity of a combustible material 16 such as charcoal, charcoal briquettes, wood, coke, or other solid carbonaceous combustible material 16, in a combustible packaging 17 and contained within the carton. The charcoal or other combustible material 16 can also be provided in a container 17*a* and packaged separately from the carton 12. The kit 14 may also include instructions 18 for setting up the carton and its components for igniting the unit to prepare it for cooking. For example, as shown, a removable overwrap 18*a* with written instructions and/or illustrations on one side showing the set-up of the carton and its components, and coupons, advertising or other information imprinted on the same side or the underside, can be attached around the carton. Instructions for the set-up and other information can also be printed directly on the carton. The kit 14 can further include one or more additional articles 19 such as matches, a grill or rack, hotpads, grilling utensils, dishware and tableware.

The carton 12 is made of a combustible material having sufficient rigidity to maintain the shape of the erected carton, while supporting the contents of the carton. The carton 12 is preferably made of paperboard or corrugated cardboard, that will burn completely with little or no residue remaining so that clean up is not required. Most preferably, the carton is made from pressed paperboard.

Advantageously, the firestarter 15 is a solid shape article that is composed of an organic material that is made of materials that provide a safe, combustible starter without fuses, volatile solvents, or "super hot" burning chemicals such as magnesium compounds. The firestarter can be readily ignited and maintain a burn to effectively ignite the carton and kindle the charcoal. A preferred firestarter is a pressed article composed of paraffin wax mixed with wood shavings, fine wood chips, saw dust, paper pulp, wood pulp, and the like.

In a method of preparing a cooking fire with the present packaging, a combustible packaging or carton 12 containing charcoal or other combustible material 16 is selected; a fire starter 15 is removed from a position proximate the packaging; a plurality of legs are deployed to raise the packaging; the firestarter 15 is positioned beneath the packaging and between the legs; the firestarter is lit; and the lit firestarter is allowed to burn the packaging and correspondingly kindle the charcoal.

Figure 2:
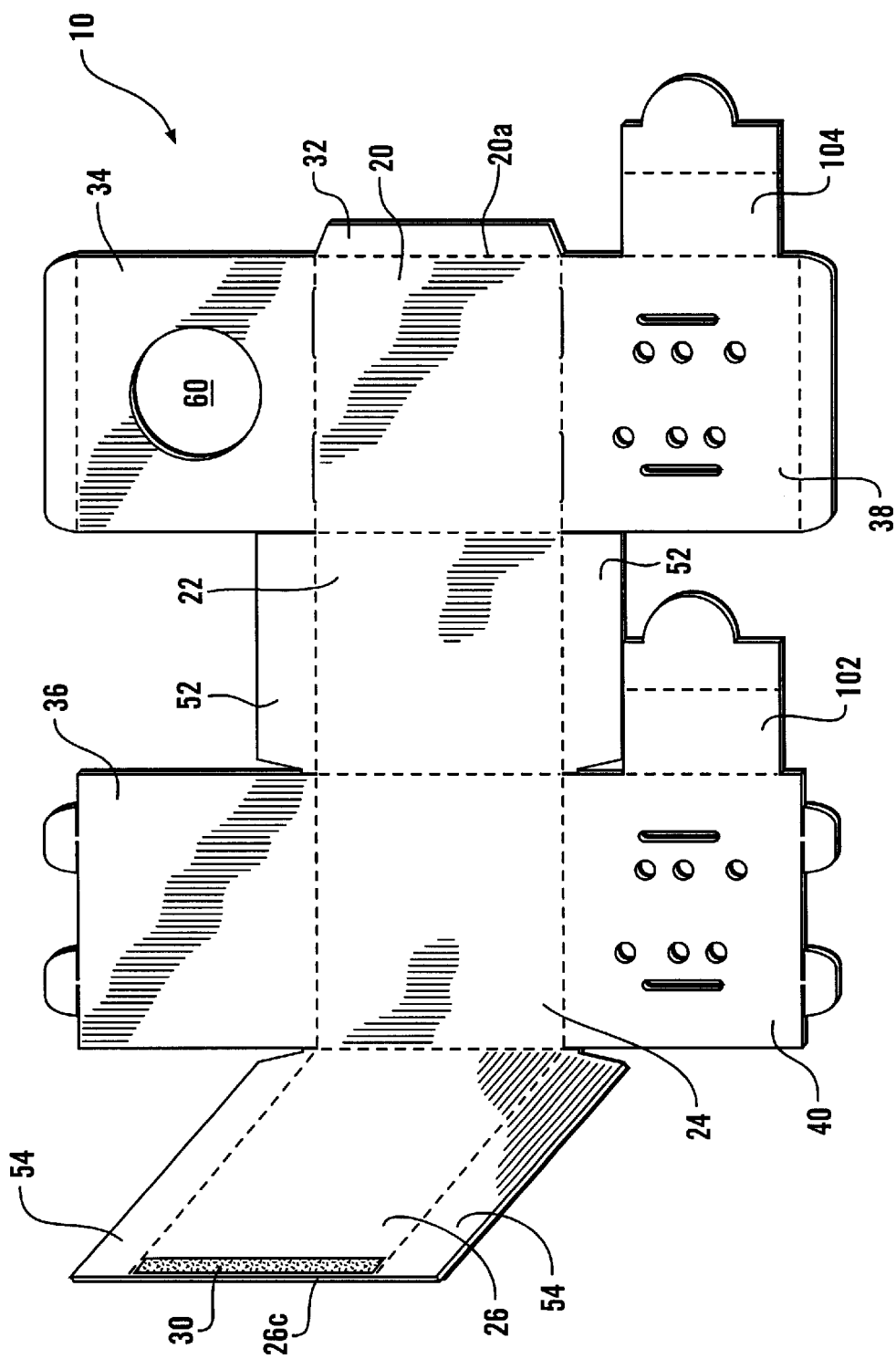
FIG. 2 is a perspective view of the blank of FIG. 1, showing the second sidewall panel 26 being folded to form a carton.
Figure 3:
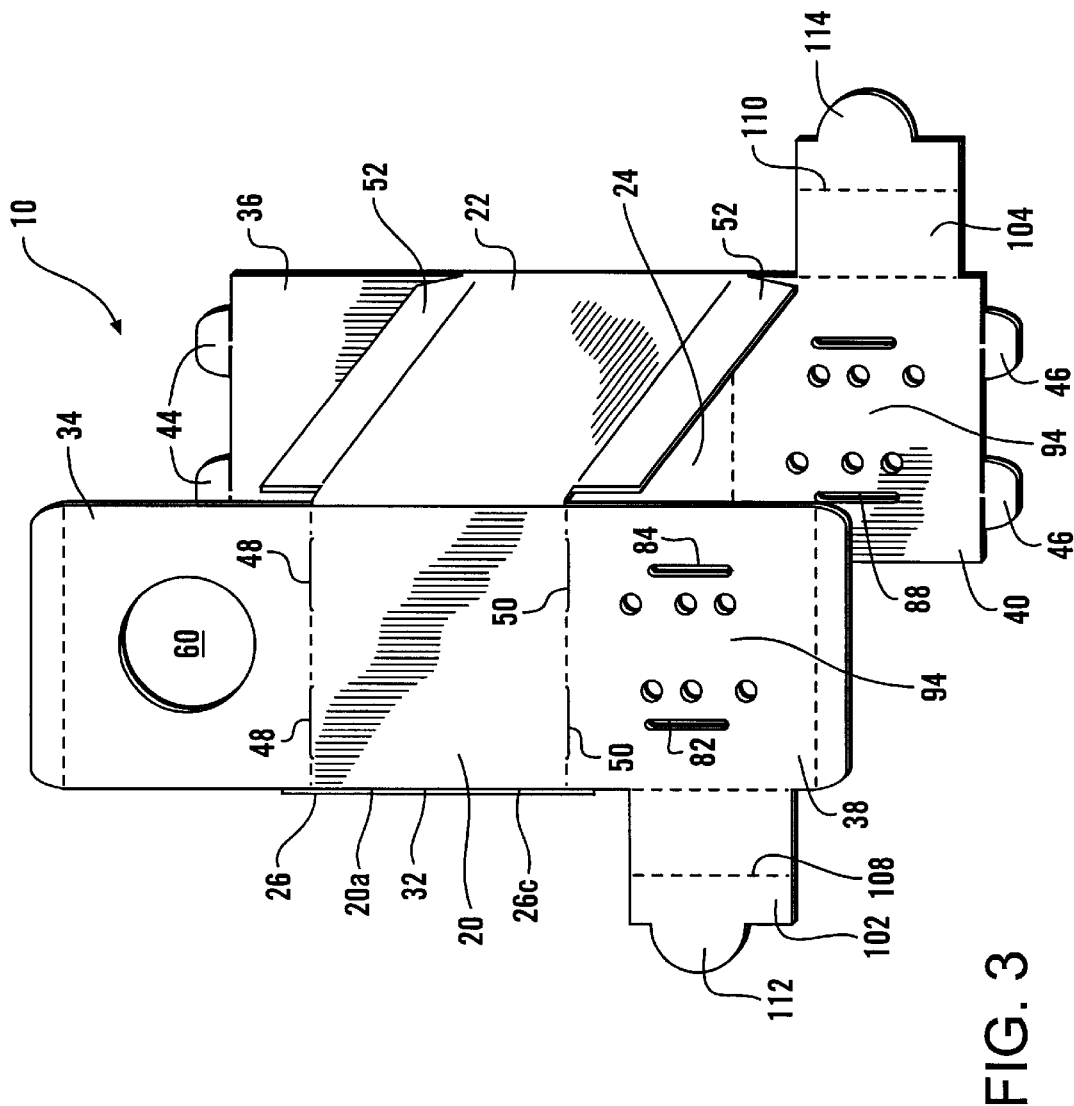
FIG. 3 is a perspective view of the blank of FIG. 1, showing the second sidewall panel 26 attached to the front side panel 20.

An example of a carton blank 10 for forming the carton 12, is shown in FIG. 1. The carton blank 10 includes four side panels 20, 22, 24, 26 foldably connected to form the sidewalls of the erected carton 12 (FIG. 15). The side panels include a front side panel 20, a back side panel 24, and first and second sidewall panels 22, 26. Each of the side panels has four sides or edges designated as a, b, c, d. The first sidewall panel 22 is positioned between the front side panel 20 and the back side panel 24, and is foldably connected along opposing sides 22*a*, 22*c* to side 20*c* of the front side panel 20 and side 24*a* of the back side panel 24. The second sidewall panel 26 is positioned adjacent to the back side panel 24, and is foldably connected along side 26*a* to side 24*c* of the back side panel 24. In erecting carton 12, side 26*c* of the second sidewall panel 26 is attached to side 20*a* of the front side panel 20 (FIGS. 2 and 3). The two panels 20, 26 can be joined by any suitable means, including adhering an adhesive strip 30 over a tab or flap 32 that is foldably connected along side 20*a* of the front side panel 20.

The carton blank 10 also includes two overlaying top panels 34, 36, and two overlaying base panels 38, 40. Each of the top and base panels have four sides designated as a, b, c, d. The first top panel 34 is foldably connected along side 34*d* to side 20*b* of the front side panel 20, and the second top panel 36 is foldably connected along side 36*d* to side 24*b* of the back side panel 24. The first base panel 38 is foldably connected along side 38*b* to side 20*d* of the front side panel 20, and the second base panel 40 is foldably connected along side 40*b* to side 24*d* of the back side panel 24.

Figure 5:
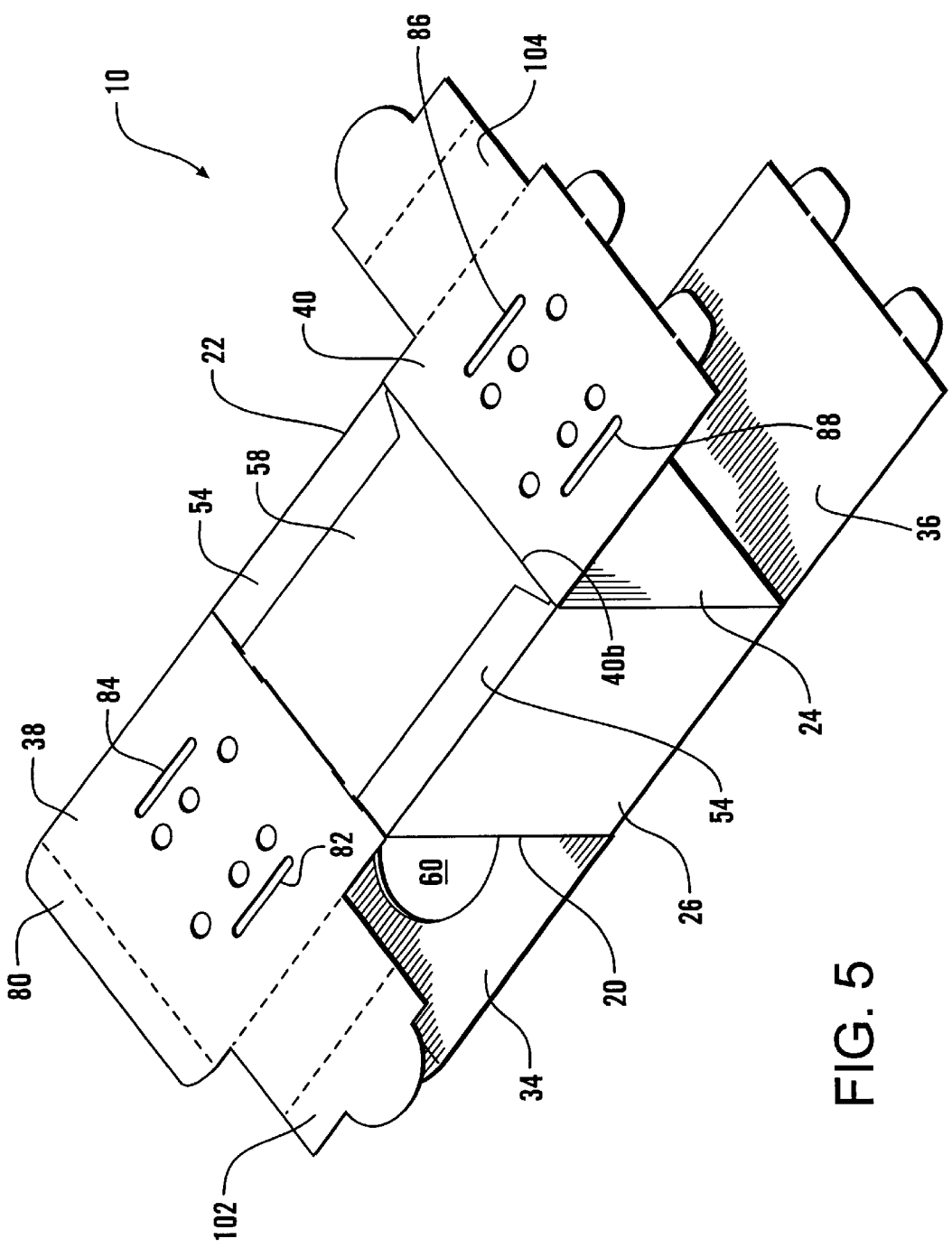
FIG. 5 is a perspective view of the blank of FIG. 4, showing the base panels 38, 40 and the top panels 34, 36 folded outward.
Figure 9:
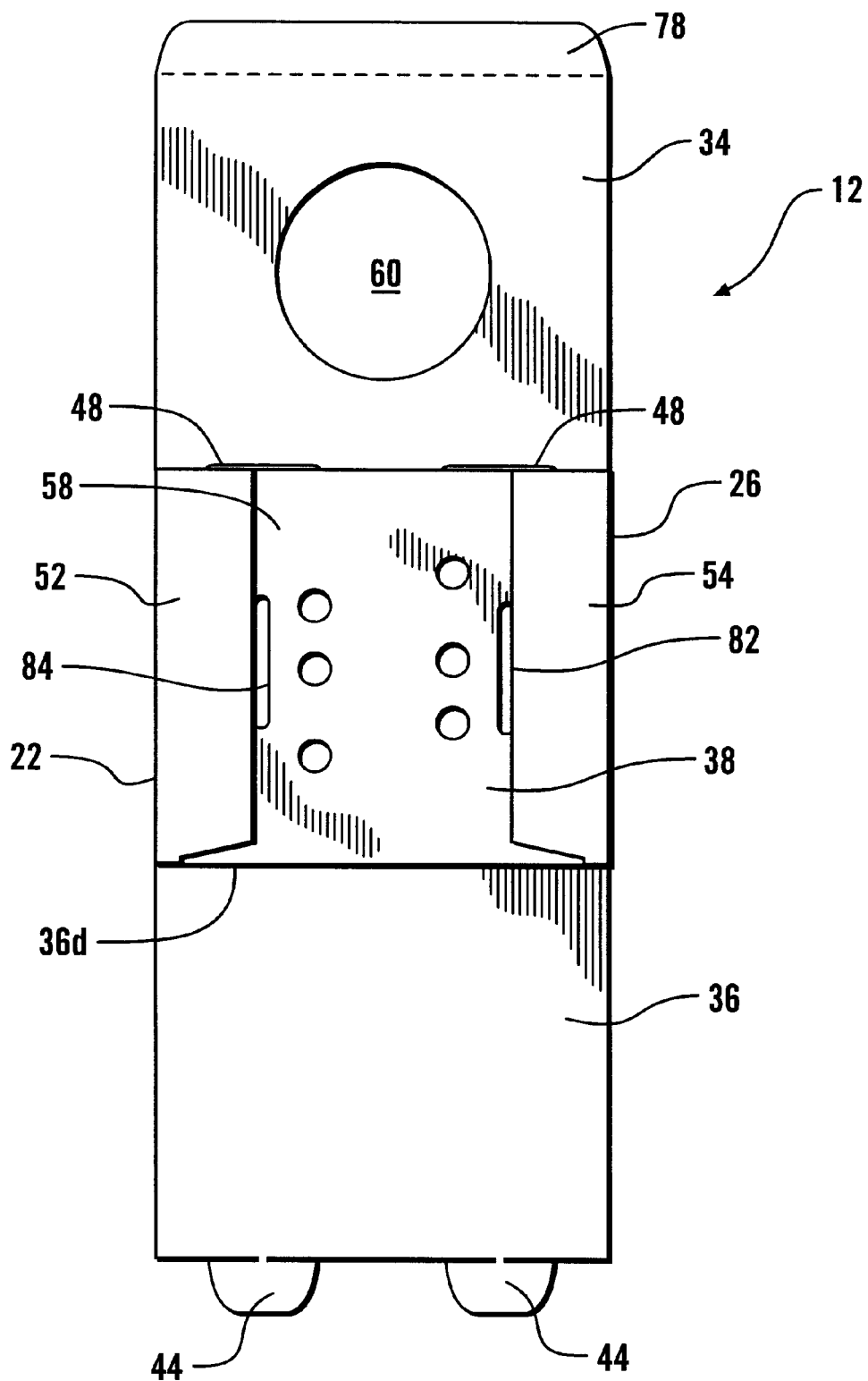
FIG. 9 is a bottom plan view of the blank/carton of FIG. 8, showing the flaps 52, 54 folded inward into the carton.

When the carton blank 10 is assembled into the erected carton, the two base panels 38, 40 are positioned over each other (FIGS. 5–7), and the two top panels 34, 36 are positioned over each other (FIGS. 9–12 and 15). Preferably, the carton blank 10 includes flaps 52, 54, which are folded inward on the erected carton to provide support for the top panels and the base panels so that they do not collapse or sink into the interior 58 of the erected carton (FIGS. 5 and 9).

Figure 6:
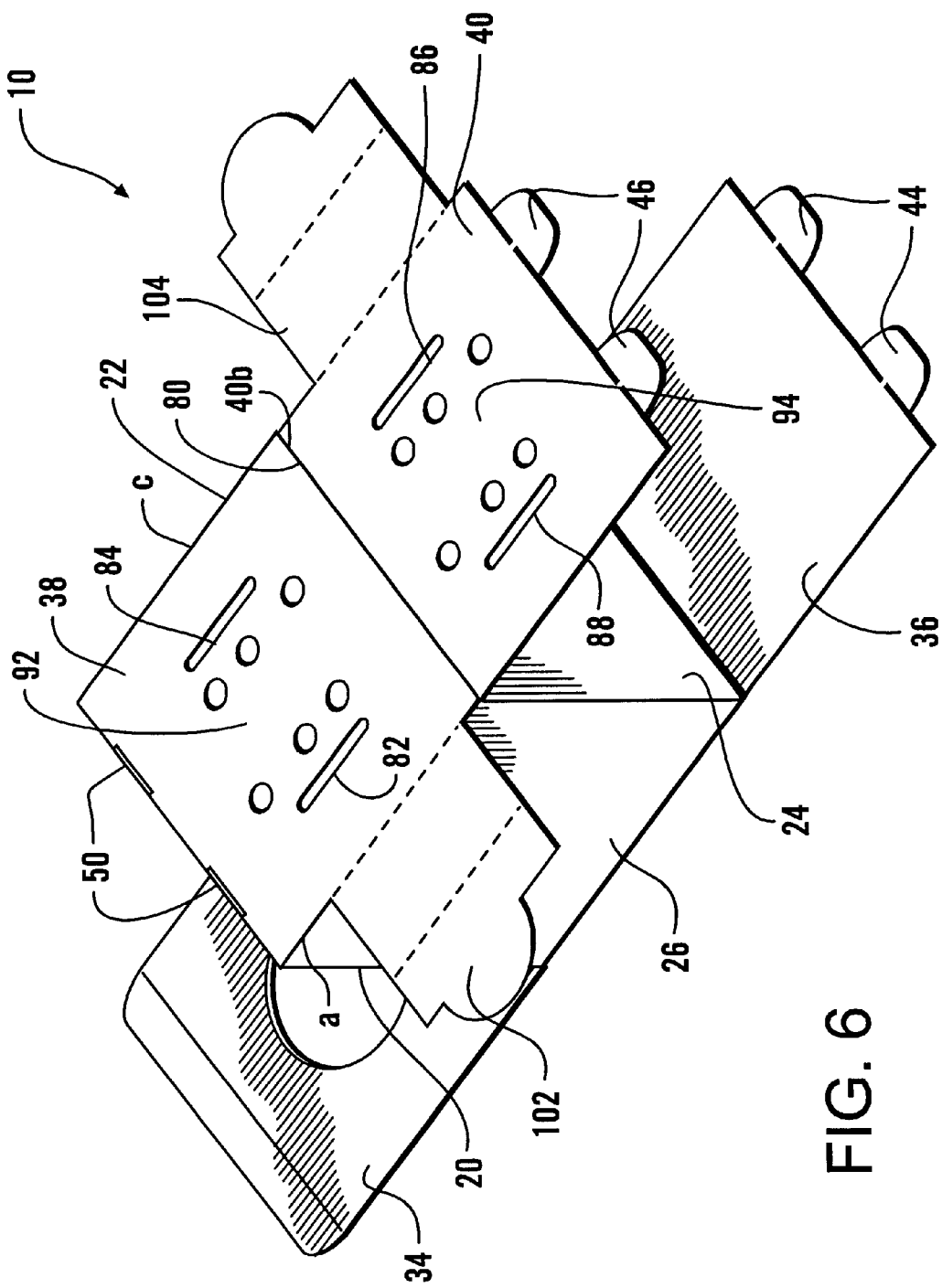
FIG. 6 is a perspective view of the blank of FIG. 5, showing the first base panel 38 folded onto the carton.
Figure 10:
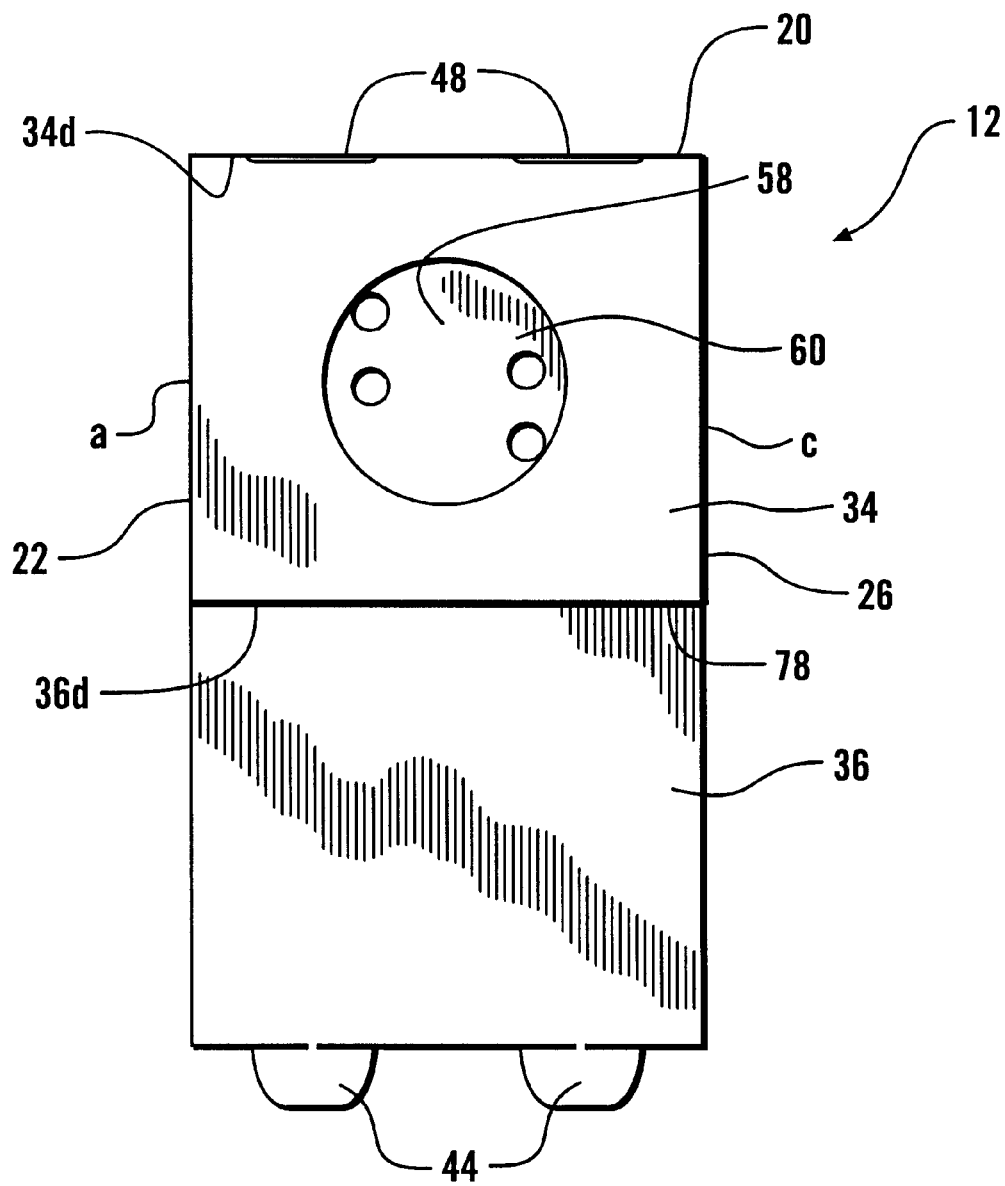
FIG. 10 is a bottom plan view of the blank/carton of FIG. 9, showing the first top panel 34 folded onto the carton 12.

The first top panel 34 and the first base panel 38 can include a foldably connected flap 78, 80 along sides 34*d*, 38*b*, respectively, for securing the panels to the carton 12. As shown in FIGS. 9–10, when the first top panel 34 is folded onto the erected carton, the flap 78 is inserted into the carton at the fold along side 36*d* of the second top panel 36. Likewise, the flap 80 of the first base panel 38 is inserted into the carton at the fold along side 40*b* of the second base panel 40 (FIGS. 5–6). To secure the second top panel 36 and the second base panel 40 to the carton, the panels include one or more tabs 44, 46, that are inserted into slits 48, 50 in the fold along side 34*d* of the first top panel 34 and along side 38*b* of the first base panel 38 (FIGS. 6–7 and 10–11).

Optionally, the fold along side 36*d* of the second top panel 36 can be perforated so that the panel 36 can be easily removed from the carton 12 (FIG. 16). The second top panel 36 can also be perforated in a line 72 perpendicular to its hinged connection with the back side panel 24, which allows the panel 36 to be separated into two halves, I and II (FIG. 1).

Figure 17:
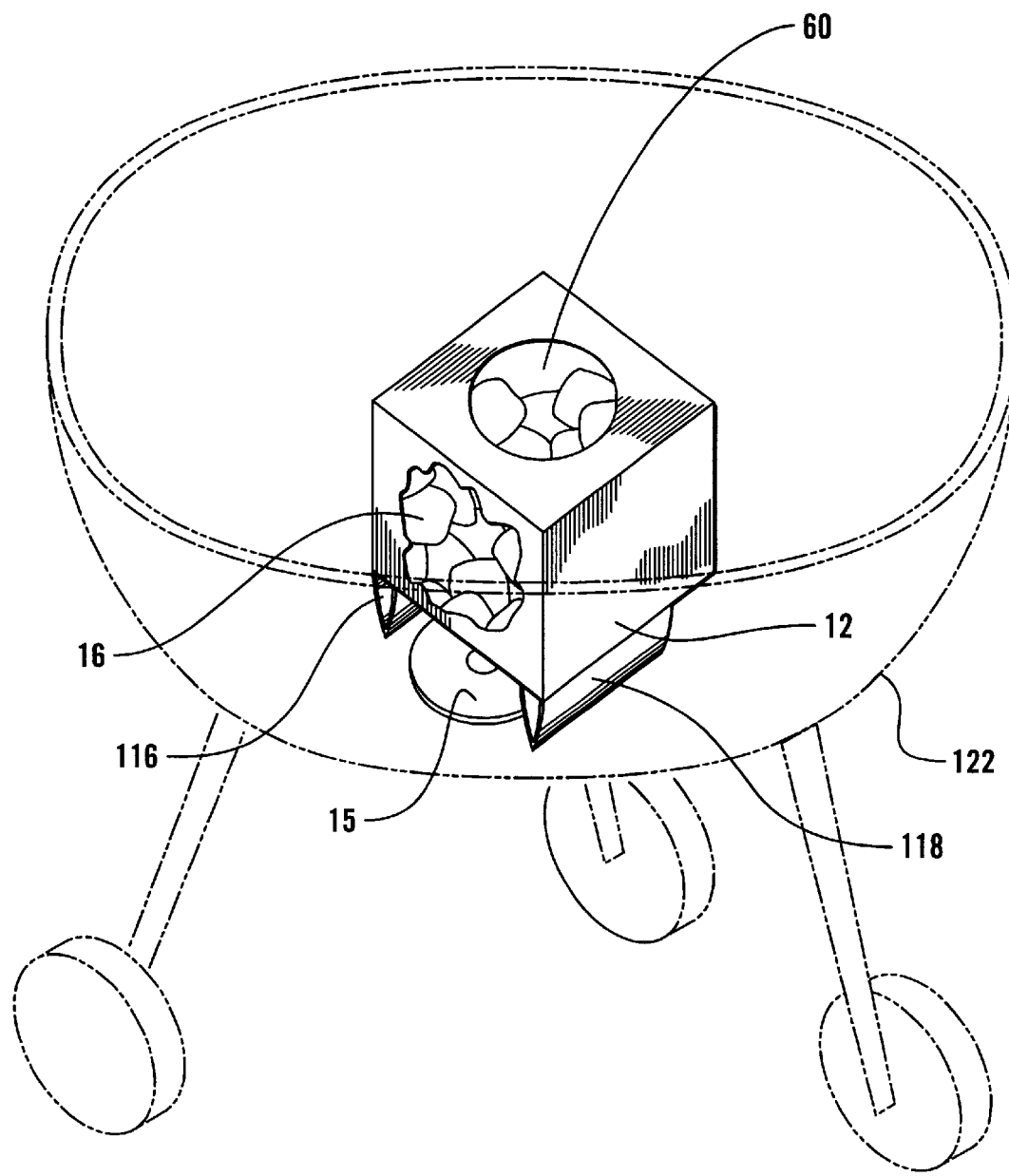
FIG. 17 is a perspective view of the carton of FIG. 16, placed on a grill 122 with the firestarter 15 placed underneath.

The first top panel 34 includes an opening 60 that is sized to removably retain a fire starting material or firestarter 15. The firestarter can be carried in a container capable of holding the firestarter in place in the opening 60 or configured so as to ride in the opening by itself (FIGS. 15–16). The firestarter 15 is sized and shaped such that it can be inserted and securely held in the opening 60 of the first top panel 34, and the second top panel 36 can be folded down flat onto the first top panel 34. In use, the firestarter 15 is removed from the carton, placed underneath the carton 12, and ignited (FIG. 17). The opening 60 thus serves a dual role in maintaining the firestarter away from the fuel 16 during storage/shipping, and as a vent to provide a drafting effect for effective kindling of the fuel inside the carton.

Figure 7:
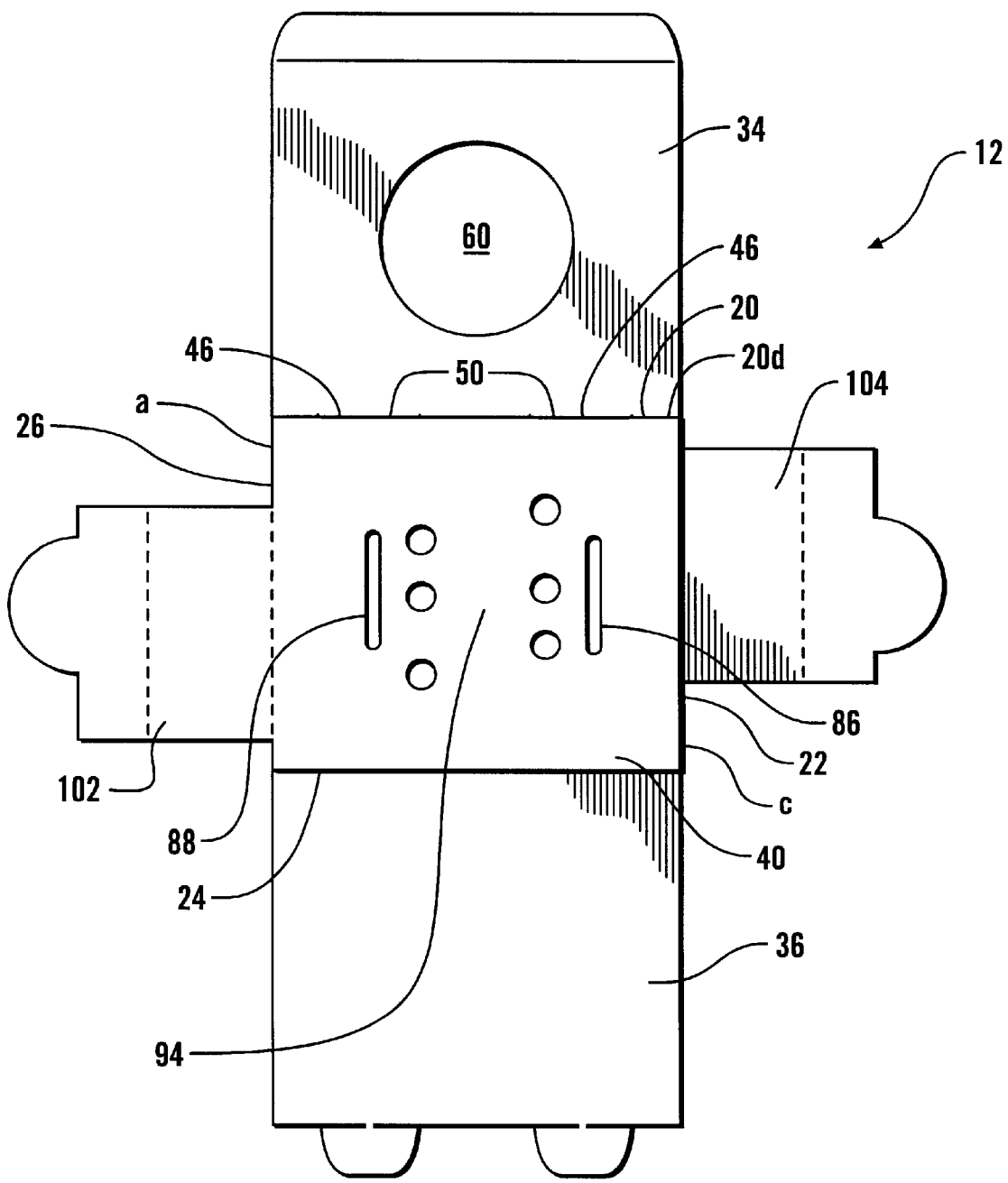
FIG. 7 is a bottom plan view of the view of the blank of FIG. 7 showing the second base panel 40 folded onto the first base panel 38.
Figure 8:
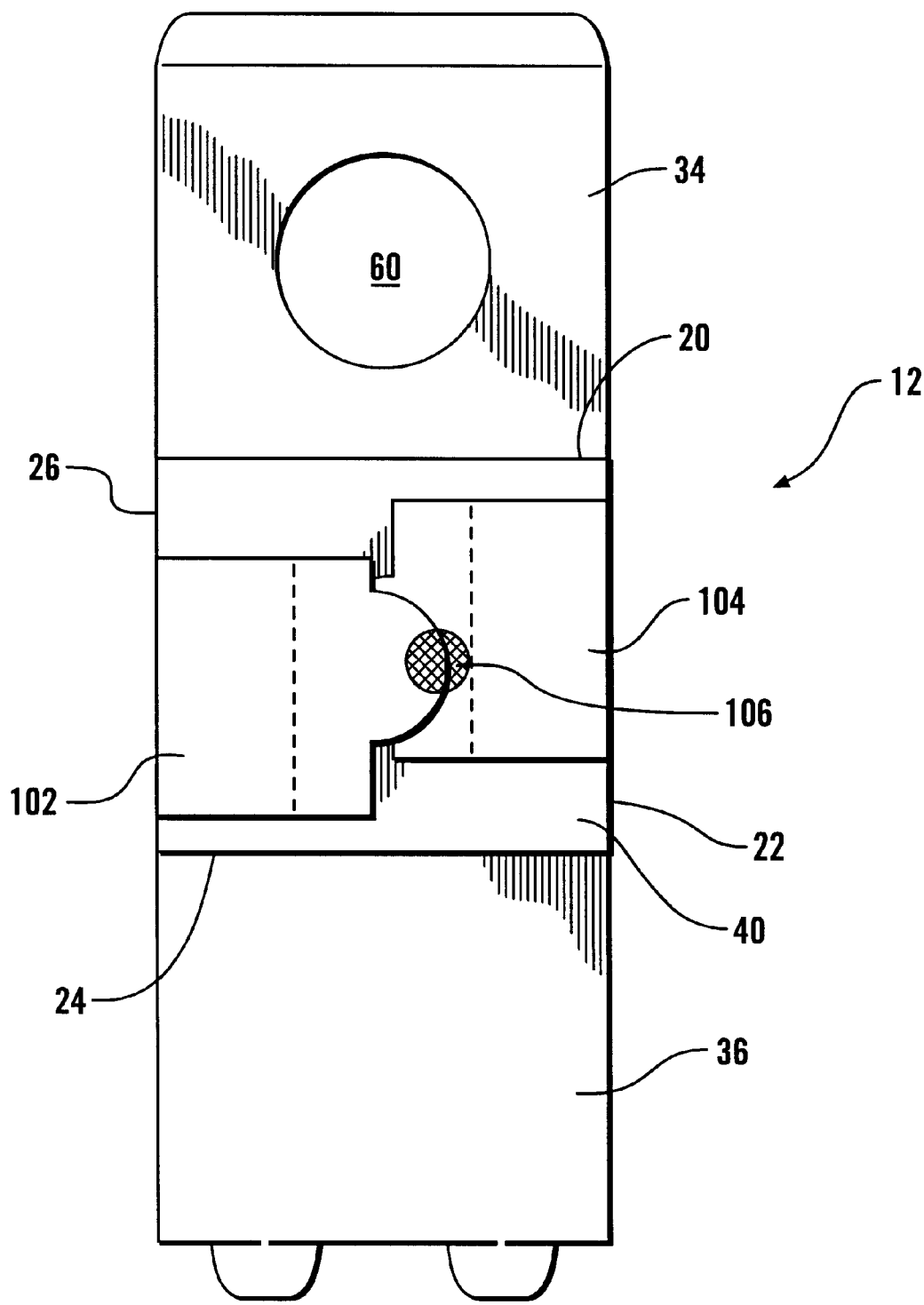
FIG. 8 is a bottom plan view of the blank/carton of FIG. 7, showing the leg extensions 102, 104 folded and secured onto the second base panel 40.

Along each of the first and second base panels 38, 40, is a foldably connected leg segment 102, 104. As shown, the leg segments 102, 104 are connected along sides 38*a* and 40*a*, respectively, but can also be positioned along sides 38*c* and 40*c*, respectively. During storage and prior to use of the erected carton 12, the leg segments 102, 104 are folded flat against the outer base panel 40 and secured together, for example, by a releasable adhesive tab 106 or other suitable means, as shown in FIG. 8. Each of the first and second base panels 38, 40, include two elongate slots 82, 84 and 86, 88, and a center access area 92, 94. The center access areas 92, 94, can be in the form of vent holes as shown or a thin center section (not shown). The elongate slots 82, 84 and 86, 88 are positioned adjacent to and parallel with sides 38*a*, 38*c*, 40*a*, 40*c*, respectively, and perpendicular to the fold along side 38*b* and 40*b*. When the base panels 38, 40 are overlapped, in the erected carton 12, the elongate slots (82 with 88, 84 with 86) and the center access sections (92 with 94) are aligned, as shown in FIGS. 5–7. In the use of the carton to ignite a fire, the leg segments 102, 104 are separated and folded along a score line 108, 110 (FIGS. 13–14), and the ends 112, 114 are inserted into the pair of elongate slots 82/88 and 84/86, respectively, to provide a pair of leg support members 116, 118. The leg supports 116, 118 are positioned underneath the carton 12, such that center access sections 92/94 in the base panels are unobstructed. The center access areas permit direct access to the charcoal 16 by a flame from the firestarter 15 and air flow into the interior 58 of the carton 12 (FIG. 17).

Figure 4:
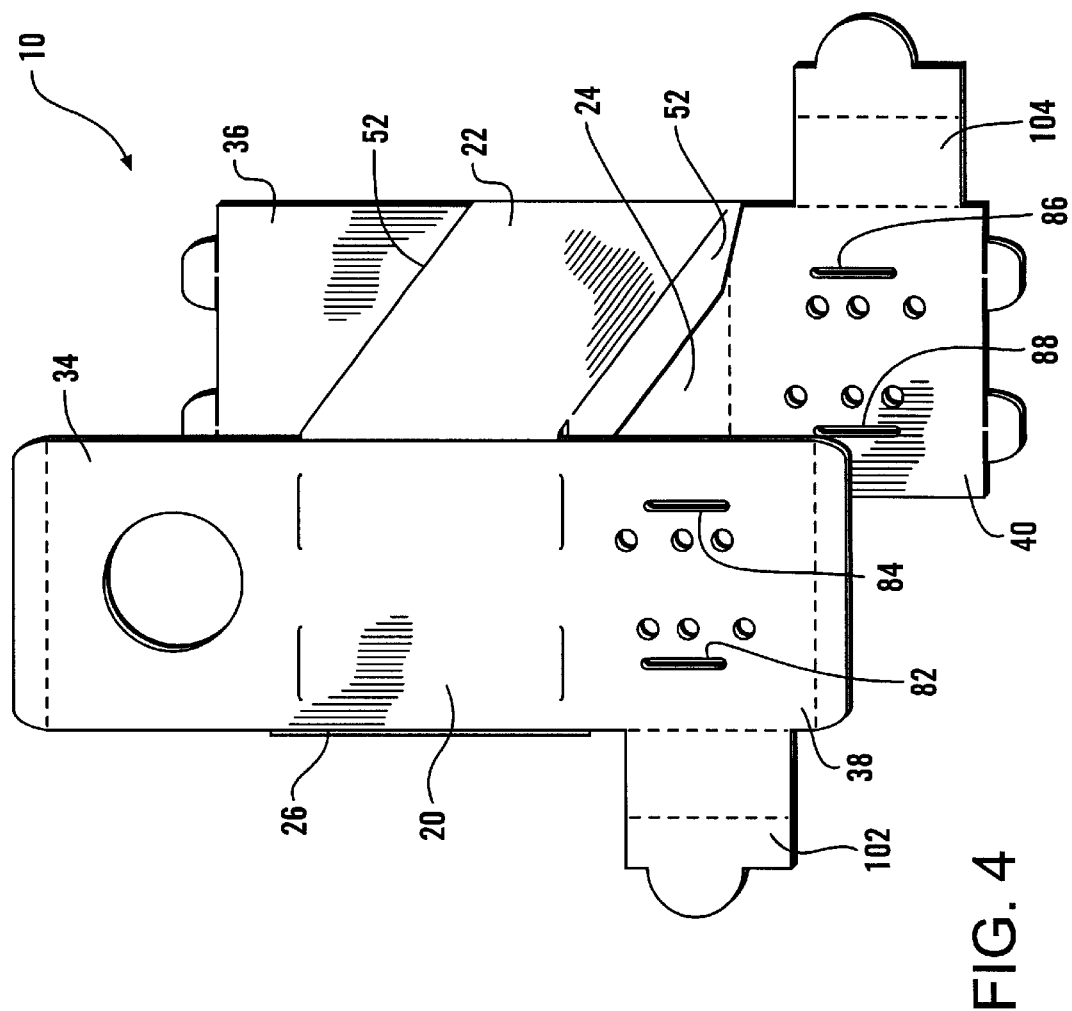
FIG. 4 is a perspective view of the blank of FIG. 3, showing the flaps 52, 54 folded inward into the carton.
Figure 11:
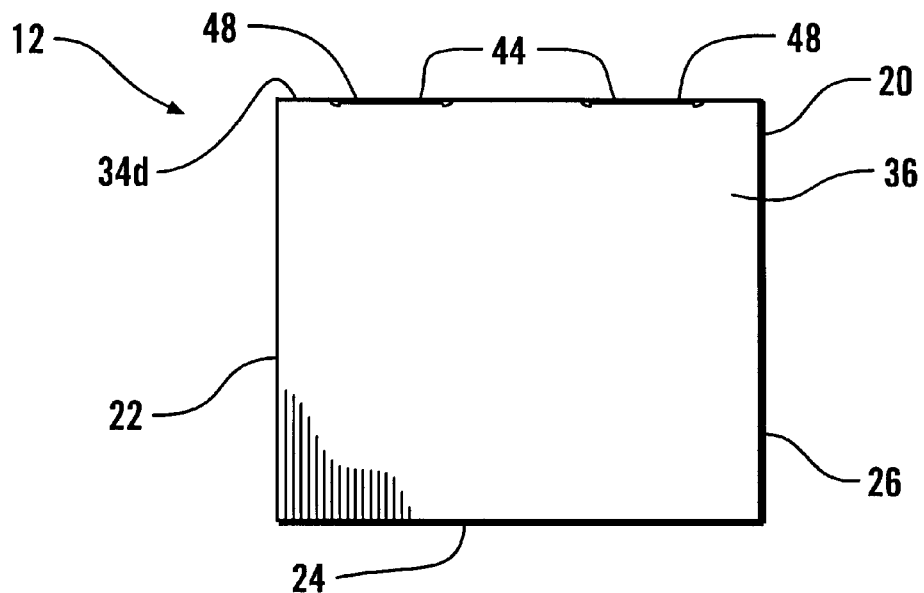
FIG. 11 is a top plan view of the carton formed from the blank 10 of FIGS. 1–10, showing the second top panel 36 folded onto the first top panel 34.
Figure 12:
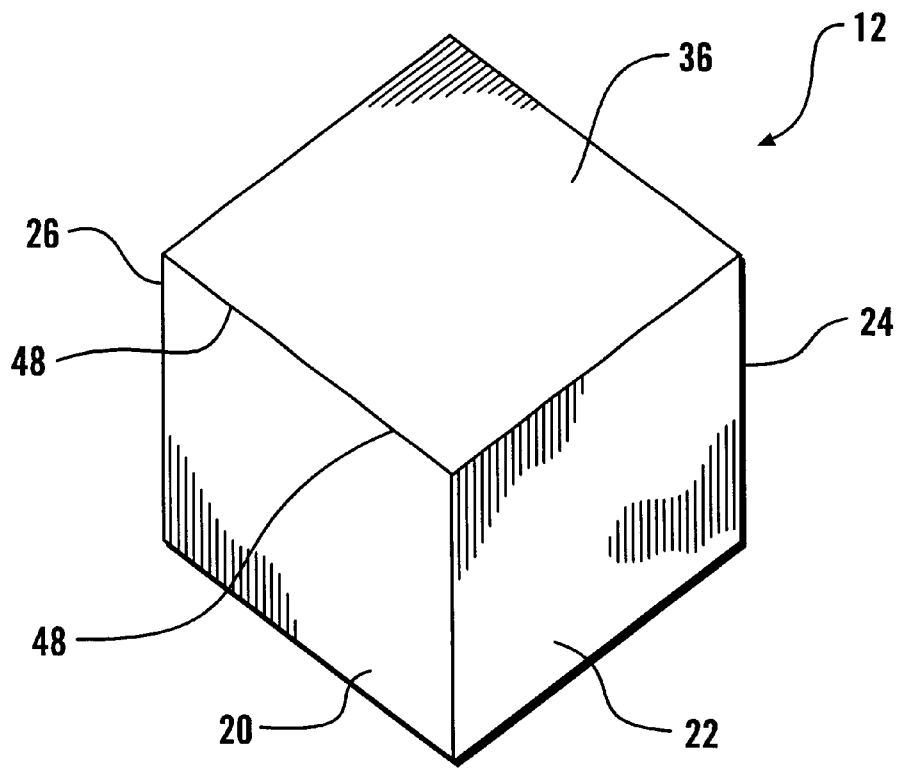
FIG. 12 is a perspective view of the carton in FIG. 11.

Referring now to FIGS. 2–12, to form a carton 12 from the foregoing carton blank 10, the four side panels 20, 22, 24, 26 are folded. The front side panel 20 is attached to the second sidewall panel 26, for example, by adhering the adhesive tab 30 to the fold 32 of the front side panel 20 (FIGS. 2–3). The flaps 52, 54 of the first and second sidewall panels 22, 24 are folded inward (FIGS. 3–4). As depicted in FIGS. 5–6, the first base panel 38 is folded onto the carton, and the flap 80 is inserted into the carton adjacent the fold along side 40*b* of the second base panel 40. The second base panel 40 is folded onto the first base panel 38 (FIG. 7), and secured to the carton by inserting the tabs 46 into the slits 50 located in the fold along side 20*d* of the front side panel 20. The leg segments 102, 104 are folded underneath and flush against the outer base panel 40 of the carton, and the ends 112, 114 are secured to each other and/or to the surface of the second base panel 40 by a tab 106 (FIG. 8). A single use amount of charcoal briquettes 16 or other suitable combustible material can be placed inside the carton. Referring to FIGS. 9–10, the first top panel 34 is folded onto the carton and the flap 78 is inserted into the carton adjacent the fold along side 36*d* of the second top panel 36. The fire starter material 15 is inserted into the opening 60 in the first top panel 34 (FIG. 15). The second top panel 36 is then folded onto the first top panel 34 and secured to the carton by inserting the tabs 44 into the slits 48 located in the fold along side 34*d* of the first top panel (FIGS. 11–12). The carton 12 is then ready for transport, further processing, storage, or shipment.

Figure 13:
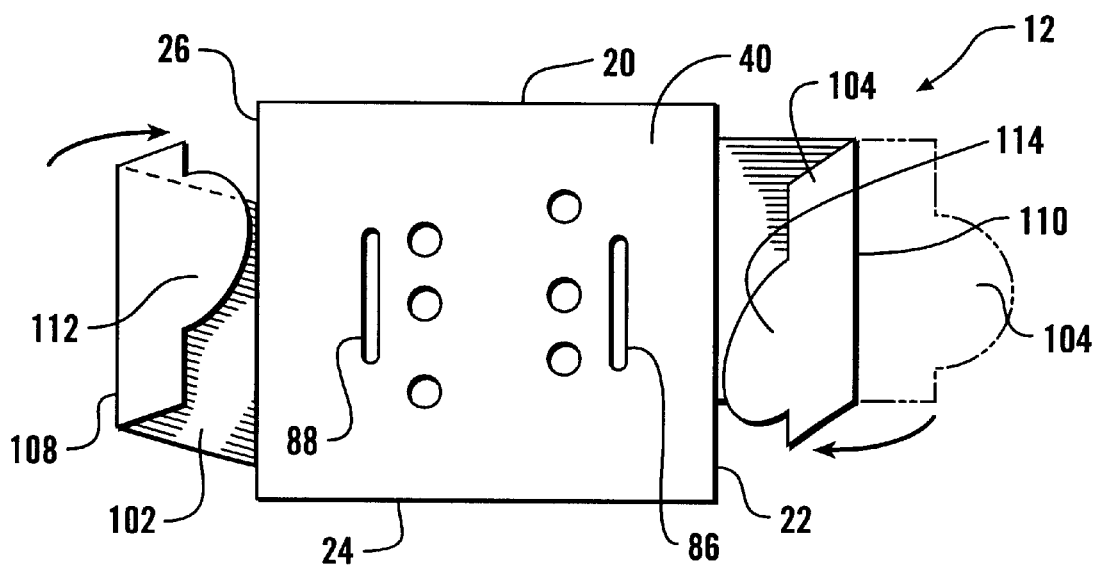
FIG. 13 is a bottom plan view of the carton of FIG. 12, showing the folding of the leg extensions 102, 104.
Figure 14:
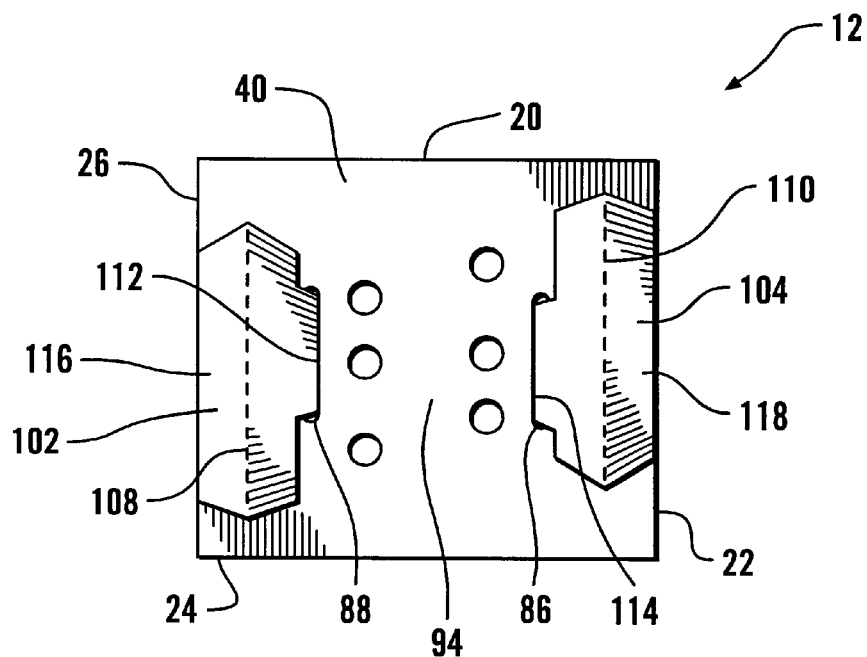
FIG. 14 is a bottom plan view of the carton of FIG. 13, showing the leg extensions 102, 104 secured in the longitudinal grooves 86, 88 to form the leg support members 116, 118.

In use, the carton 12 is converted to a fire-starting assembly. The leg segments 102, 104 are separated from each other, folded underneath the carton along the score line 108, 110, and the ends 112, 114 are secured into the adjacent elongate slot pairs 82/88 and 84/86 to form the support legs 116, 118 (FIGS. 13–14). The second top panel 36 is raised to expose the fire starter material 15 in the opening 60 of the first top panel 34 (FIGS. 15–16), and the firestarter 15 is removed and placed onto a surface such as a barbecue grill 122 (FIG. 17). The carton is placed over the firestarter, which is positioned under the center access areas 92/94 between the two legs 116, 118, and the fire starting material is ignited. The second top panel 36 remains folded back, or is preferably removed (FIG. 16), so that the opening 60 in the first top panel 34 remains open to provide a draft effect to draw air through the carton. The height of the support legs 116, 118 are sufficient to place the underside of the carton 12 at a suitable distance from the fire starting material 15 to allow sufficient airflow for the flame to burn and ignite the carton 12 and the combustible material 16 inside.

The invention has been described by reference to detailed examples and methodologies. These examples are not meant to limit the scope of the invention. Variations within the concepts of the invention are apparent to those skilled in the art. The disclosures of the cited references throughout the application are incorporated by reference herein.

What is claimed is:

1. A stackable, combustible fuel package, comprising:
   a cardboard carton with selectively deployable legs having a first, retracted position and a second, deployed position, wherein said legs when in said retracted position facilitate shipment, storage and display of said carton;
   a charcoal material contained in said carton;
   a firestarter removably carried in said carton;
   wherein the selectively deployable legs, when in said deployed position, are structured to raise the carton off of a surface sufficient for placement of said firestarter under the carton.

2. The package according to claim 1, wherein removal of the firestarter from the carton creates a vent in the carton.

3. The carton according to claim 1, wherein the firestarter is a mixture of a wax and a natural combustible material.

4. The carton according to claim 3, wherein the natural combustible material is wood shavings, wood chips, sawdust, paper pulp, wood pulp, and mixtures thereof.

5. The carton according to claim 1, wherein the firestarter is shaped as a disc.

6. The carton according to claim 1, wherein the legs of said carton form a V-shape configuration when deployed.

7. The carton according to claim 1, wherein the legs are foldably connected to the carton, and deployed by folding underneath the carton.

8. The carton according to claim 7, wherein the legs are formed by inserting one end thereof into an opening in the carton.

9. The carton according to claim 1, wherein the carton is composed of paperboard, or corrugated cardboard.

10. The carton according to claim 9, wherein the carton is composed of paperboard.

11. The carton according to claim 1, wherein the carton comprises a base having multiple openings therein.

12. The carton according to claim 11, further comprising a paper material covering the base and openings.

13. The carton according to claim 1, wherein the carton comprises a top panel having an opening sized for carrying the firestarter therein.

14. The carton according to claim 13, wherein the carton further comprises a panel foldably connected to the carton and covering the top panel.

15. The carton according to claim 14, wherein the covering panel is detachable from the carton along the foldable connection with the carton.

16. The carton according to claim 1, further comprising an overwrap for substantially encircling an assembled carton to provide additional space for graphics, content, advertising, instructions or coupons.

17. A fuel package comprising:
  a container composed of a combustible material, and having a base and selectively deployable legs connected to the base, said legs having a first retracted position and a second deployed position, where said legs when in said retracted position facilitate shipment, storage and display of the container; and
  a single-use amount of a charcoal material and a firestarter housed within the container, wherein the container maintains the firestarter separate from the charcoal material and allows direct access to the firestarter from the container for removal therefrom, and wherein the legs of the container when in said deployed position are structured to maintain the base of the carton at a distance from the firestarter placed underneath the container and allow air flow to the base of the container to maintain the burning of the firestarter and charcoal material inside the container.

18. A fuel package according to claim 17, wherein said container is a carton.

19. A fuel package according to claim 18, wherein said carton is paperboard or corrugated cardboard.

20. A fuel package according to claim 17, further comprising an overwrap for substantially encircling the container to provide additional space for graphics, content, advertising, instructions or coupons.

21. A stackable enclosure without internal structure, comprising:
  means selectively movable between a first, retracted position and a second, deployed position wherein said means, when in said first, retracted position, facilitates shipment, storage and display of the enclosure and when in said second, deployed position, raises the enclosure off a surface;
  a non-volatile firestarter removably mounted within the enclosure for ignition without a wick; and
  a combustible cooking material carried within the enclosure for ignition by the firestarter.

22. A stackable enclosure according to claim 21, further comprising an overwrap for substantially encircling the enclosure to provide additional space for graphics, content, advertising, instructions or coupons.

23. A carton blank for forming a carton, comprising:
  four side panels, a top panel, and a base panel;
  the base panel having structure deployable to selectively raise the carton off of a surface, and the top panel having an opening sized for carrying a firestarter therein.

24. The carton blank according to claim 23, wherein the base panel further comprises multiple openings therein.

25. A kit for generating a cooking fire, comprising:
  a single meal quantity of charcoal enclosed in a stackable, combustible container;
  a firestarter removably held in the carton for igniting the carton and the charcoal; and
  selectively deployable legs integral with the container and having a first retracted position for facilitating shipment, storage and display of the kit and also having a second, deployed position for lifting the container such that the firestarter can be positioned between the legs.

26. The kit according to claim 25, wherein the container maintains the firestarter separate from the charcoal material and allows direct access to the firestarter from the container for removal therefrom.

27. The kit according to claim 25, wherein the carton comprises a top panel having an opening sized for carrying the firestarter therein.

28. The kit according to claim 27, wherein the carton further comprises a panel foldably connected to the carton and covering the top panel.

29. The kit according to claim 28, wherein the covering panel is detachable from the carton along the foldable connection with the carton.

30. The kit according to claim 25, wherein said container is a carton.

31. The kit according to claim 30, wherein the carton is paperboard or corrugated cardboard.

32. The kit according to claim 22, further comprising a grill.

33. A method of preparing a cooking fire, comprising:
  selecting a packaging containing charcoal;
  removing a firestarter from a position proximate said carton;
  deploying a plurality of legs to raise said carton;
  positioning said firestarter beneath said carton between said legs;
  lighting said firestarter; and
  allowing said lit firestarter to burn said carton and correspondingly kindle said charcoal.

34. A stackable, combustible fuel package, comprising:
  a cardboard carton with a top panel and selectively deployable legs;
  a charcoal material contained in said carton;

a firestarter removably carried in-an opening in said top panel, the opening sized for carrying the firestarter therein;

wherein the selectively deployable legs are structured to raise the carton off of a surface sufficient for placement of said firestarter under the carton.

35. The package according to claim 34, wherein removal of the firestarter from the top panel creates a vent in the top panel.

36. The carton according to claim 34, wherein the firestarter is a mixture of a wax and a natural combustible material.

37. The carton according to claim 36, wherein the natural combustible material is wood shavings, wood chips, sawdust, paper pulp, wood pulp, and mixtures thereof.

38. The carton according to claim 34, wherein the firestarter is shaped as a disc.

39. The carton according to claim 34, wherein the legs of said carton form a V-shape configuration when deployed.

40. The carton according to claim 34, wherein the legs are foldably connected to the carton, and deployed by folding underneath the carton.

41. The carton according to claim 40, wherein the legs are formed by inserting one end thereof into an opening in the carton.

42. The carton according to claim 34, wherein the carton is composed of paperboard, or corrugated cardboard.

43. The carton according to claim 42, wherein the carton is composed of paperboard.

44. The carton according to claim 34, wherein the carton comprises a base having multiple openings therein.

45. The carton according to claim 44, further comprising a paper material covering the base and openings.

46. The carton according to claim 34, wherein the carton further comprises a panel foldably connected to the carton and covering the top panel.

47. The carton according to claim 46, wherein the covering panel is detachable from the carton along the foldable connection with the carton.

48. The carton according to claim 34, further comprising an overwrap for substantially encircling an assembled carton to provide additional space for graphics, content, advertising, instructions or coupons.

49. A fuel package comprising:

a container composed of a combustible material, and having a top panel, a base and selectively deployable legs connected to the base; and a single-use amount of a charcoal material and a firestarter housed within an opening in the top panel, wherein the opening is sized for carrying the firestarter and the top panel effectively maintains the firestarter separate from the charcoal material and allows direct access to the firestarter from the container for removal therefrom, and wherein the legs of the container are structured to maintain the base of the carton at a distance from the firestarter placed underneath the container and allow air flow to the base of the container to maintain the burning of the firestarter and charcoal material inside the container.

50. A fuel package according to claim 49, wherein said container is a carton.

51. A fuel package according to claim 50, wherein said carton is paperboard or corrugated cardboard.

52. A fuel package according to claim 49, further comprising an overwrap for substantially encircling the container to provide additional space for graphics, content, advertising, instructions or coupons.

53. A stackable enclosure without internal structure, comprising:

means to selectively raise the enclosure off a surface;

a non-volatile firestarter for ignition without a wick, the firestarter removably mounted within a firestarter-sized opening in an overlaying top surface of the enclosure; and a combustible cooking material carried within the enclosure for ignition by the firestarter.

54. A stackable enclosure according to claim 53, further comprising an overwrap for substantially encircling the enclosure to provide additional space for graphics, content, advertising, instructions or coupons.

55. A kit for generating a cooking fire, comprising:

a single meal quantity of charcoal enclosed in a stackable, combustible container, wherein the container includes an overlaying top panel;

a firestarter for igniting the carton and the charcoal, wherein the firestarter is removably held in a firestarter-sized opening in the top panel; and legs integral with the container for lifting the container such that the firestarter can be positioned between the legs.

56. The kit according to claim 55, wherein the top panel maintains the firestarter separated from the charcoal material and allows direct access to the firestarter from the container for removal therefrom.

57. The kit according to claim 55, wherein the carton further comprises a panel foldably connected to the carton and covering the top panel.

58. The kit according to claim 57, wherein the covering panel is detachable from the carton along the foldable connection with the carton.

59. The kit according to claim 55, wherein said container is a carton.

60. The kit according to claim 59, wherein the carton is paperboard or corrugated cardboard.

61. The kit according to claim 54, further comprising a grill.

62. A method of preparing a cooking fire, comprising:

selecting a packaging containing charcoal;

removing a firestarter from said packaging wherein the firestarter is held within an opening in an upper, overlaying surface of the packaging;

deploying a plurality of legs to raise said packaging;

positioning said firestarter beneath said packaging between said legs;

lighting said firestarter; and allowing said lit firestarter to burn said packaging and correspondingly kindle said charcoal.

* * * * *